United States Patent [19]

Alesio et al.

[11] Patent Number: 5,363,173
[45] Date of Patent: Nov. 8, 1994

[54] DOCUMENT PRODUCTION APPARATUS WITH DESELECTED FEATURE RESTORATION

[75] Inventors: Philip Alesio, Rochester; Douglas B. Beaudet, Brockport, both of N.Y.

[73] Assignee: Eastman Kodak Company, Rochester, N.Y.

[21] Appl. No.: 83,792

[22] Filed: Jun. 25, 1993

[51] Int. Cl.[5] .............................................. G03G 15/00
[52] U.S. Cl. ..................................... 355/204; 355/313
[58] Field of Search ...................... 355/313, 31 Y, 200, 355/202, 204, 311; 358/401, 296

[56] References Cited

U.S. PATENT DOCUMENTS

| | | | |
|---|---|---|---|
| 4,273,439 | 6/1981 | Markham et al. | 355/14 C |
| 4,297,025 | 10/1981 | Bach et al. | 355/14 SH |
| 5,049,929 | 9/1991 | Anderson et al. | 355/313 Y |

Primary Examiner—Joan H. Pendegrass
Attorney, Agent, or Firm—Milton S. Sales

[57] ABSTRACT

A document production apparatus includes a plurality of operator-selectable features, at least two of which mutually conflict and differ in level of assigned priority. A lower priority feature is automatically deselected when a conflicting higher priority feature is selected. The lower priority feature is automatically restored upon subsequent deselection of the higher priority feature. The restoration system either effects restoration of the lower priority feature or leaves the lower priority feature deselected based on a history of operator interactions between selecting and deselecting said higher priority feature. The lower priority feature may have a plurality of option configurations, and the lower priority feature is restored with the same option configuration as existed before the conflicting higher priority feature was selected.

7 Claims, 3 Drawing Sheets

DOCUMENT PRODUCTION APPARATUS WITH DESELECTED FEATURE RESTORATION

BACKGROUND OF THE INVENTION

1. Technical Field

This invention relates generally to document production apparatus such as copiers, printers, and other marking engines having operator-selectable features; and more particularly to what happens to a feature that has been automatically deselected because it conflicts with a higher priority feature when the higher priority feature is itself deselected.

2. Background Art

Document production apparatus are known which provide for different operator-selectable features. Many of the available features include options which allow the operator to be more specific in the actions that the document production apparatus is to employ on a job. For example, in a COVERS feature, a special sheet is provided for the front and/or back pages of a multiple-page document.

Generally, there is a default mode in which certain features are automatically selected prior to any operator input. The options associated with the default features are also automatically configured. On power-up or reset of the apparatus, the default mode is automatically designated, and its pre-programmed features and options configuration are automatically selected. The operator may select other available features and/or options for the entire document or any portion thereof.

Often, the selection of available features includes mutually exclusive features. Conflicts between mutually exclusive features must, of course, be resolved, and a common practice is to prioritize the features. An operator will not be permitted to select a lower priority feature if a higher priority, mutually exclusive feature is already selected.

Similarly, when a higher priority feature is selected, a conflicting lower priority feature must be deselected. In most cases, a message is displayed that either the new feature may not be selected or that a lower priority feature has been automatically deselected. It is also common that an audible tone is sounded to draw the operator's attention to the message display.

Such known methods for resolving conflicts between mutually exclusive features work well, and are widely used. However, there is a problem with the known methods when an operator changes his or her mind after selecting a high priority feature that has caused a conflicting lower priority feature to be deselected. Anytime after selecting a feature, but before a document production job starts to run, the operator may decide to deselect such a higher priority feature. Selecting, and then deselecting the high priority feature may cause the unintended consequence that the deselected lower priority feature remains deselected. The lower priority feature will then need to be re-selected by the operator.

Accordingly, a system is needed for efficiently and automatically restoring the deselected lower priority features when it has been predetermined, based on the history of operator interaction with the document production apparatus, that the restore of the deselected lower priority features is desired. Restoring the lower priority features that have been deselected when a higher priority feature is selected and then deselected would eliminate the need for the operator to reselect the lower priority features. Further, the chance that the document production apparatus will produce undesired output would be reduced. The operator would not have to review the feature selections after selecting then subsequently deselecting a feature. Without automatic restoration, the lower priority features needs to be manually reselected, and it is always possible that the operator will not realize that a lower priority feature needs to be reselected.

DISCLOSURE OF INVENTION

It is an object of the present invention to provide for the automatic restoration of a low priority feature that was deselected as a consequence of the selection of a conflicting higher priority feature if the higher priority feature is subsequently deselected.

It is another object of the present invention to provide for the restoration of the lower priority feature using the history of operator interactions in selecting and deselecting the higher priority feature to make the decision to either restore or to leave deselected the lower priority feature that has been deselected.

It is still another object of the present invention that when a feature is restored as a result of the deselection of a higher priority feature, it is restored with the same option configuration as existed before the feature was deselected.

In accordance with the present invention, a document production apparatus includes a plurality of operator-selectable features, at least two of which mutually conflict and differ in level of assigned priority. A lower priority feature is automatically deselected when a conflicting higher priority feature is selected. The lower priority feature is automatically restored upon subsequent deselection of the higher priority feature.

According to a preferred embodiment of the present invention, the restoration system either affects restoration of the lower priority feature or leaves the lower priority feature deselected based on a history of operator interactions in selecting and deselecting the higher priority feature. The lower priority feature may have a plurality of option configurations, and the lower priority feature is restored with the same option configuration as existed before the conflicting higher priority feature was selected.

The invention, and its objects and advantages, will become more apparent in the detailed description of the preferred embodiments presented below.

BRIEF DESCRIPTION OF THE DRAWING

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

For purposes of illustration, the present invention will be described in an environment of a digital copier/printer, although one skilled in the art will understand that the invention is useful in other types of document production apparatus. For example, the invention is useful in optical copiers, as well as in other types of printers.

Figure 1:
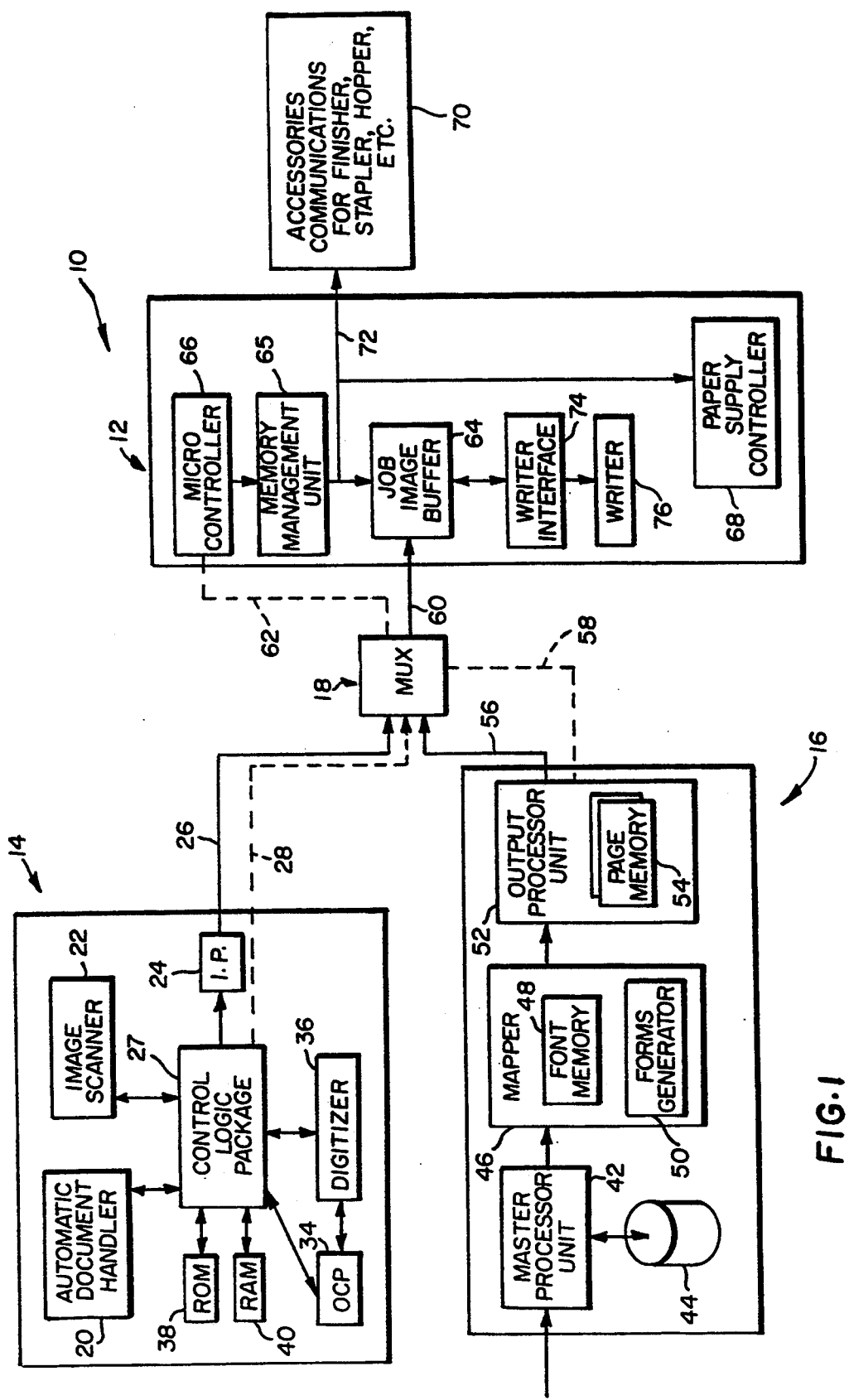
FIG. 1 is a schematic block diagram of a reproduction apparatus according to one embodiment of the present invention.

According to FIG. 1, reproduction apparatus 10 includes a marking engine 12, a scanner 14, a raster image processor 16, and a multiple input controller 18 for selecting the input to the marking engine.

A document reader such as a scanner 14 is arranged for producing a series of electrical signals representative of the image content of originals. Scanner 14 consists of an automatic document handler 20 for stream feeding multiple hard copy original pages to be automatically read by an image scanner 22 such as a linear array of solid-state charge-coupled devices. The solid state device scans the original pages, converting their images to a series of electrical signals in page format for input to marking engine 12. The image data may be manipulated by image processing electronics 24. Image processing by electronics 24 may include linearity correction, unsharp masking, image editing, windowing, document recognition, magnification accent color, color substitution, and so on. The processed image data is transmitted along an image data bus 26 to multiple input controller 18. Synchronization signals to identify separate scan lines and to provide page information and marking engine control is transmitted along a job control communications link 28.

Scanner 14 also includes a control logic package 27 having an operator control panel 34 and digitizer 36. The control logic package is an interfacing medium for the operator to input functions and to receive messages from the reproduction apparatus. Setup instructions are input to the scanner, while information for finishing and processing of jobs will be sent to marking engine 12. The logic package consists of control software, interface software, and logic hardware.

As way of example only, functions inputted by the operator at the control panel may include image editing features such as area erase (blanking and framing), image shift, book copy modes, magnification, positive-to-negative image reversal, accent (spot) color, highlighting, image overlay, screening selected areas for breaking a continuous tone original into dots for reproduction as half-tone images, etc.

Default machine setup instructions are stored in a ROM 38. In the copier mode, an operator uses control panel 34 and digitizer 36 to input setup instruction values for storage in a RAM 40. Alternatively, setup instructions may be received via removable memory media from an off line computer, or the like. The setup instructions are used by image processing electronics 24 to modify the image data from image scanner 22, or are transmitted as control signals to marking engine 12.

Raster image processor 16 includes a master processor unit 42 which receives high level commands and data in character code form from a main frame computer, network link, data processing work station, removable memory media, FAX, or the like. The commands are translated into machine control language by the master processing unit. A job buffer 44 stores incoming jobs and program codes for use by the master processing unit.

After interpreting a job, master processing unit 42 parcels the job to a mapper 46, which includes a font memory 48 for converting the character code data to a pixel pattern map. For color prints, the mapper separates the information into four raster patterns; one for each color (including black) available at marking engine 12. Mapper 46 may provide for character block moves, line drawing, trapezoidal fills, and windowing/clipping. It also includes a forms generator 50.

When the pixel pattern map is rasterized, mapper sends page information to an output processor unit 52. The output processor unit has page memory 54, which stores image planes for transmission to marking engine 12. Preferably, there are two image plane stores so that one store can be loaded while the other is being read to the marking engine. For use in a four color printer, one might want to provide eight image plane stores so that two four-color pages can be stored.

The processed image data is transmitted along an image data bus 56 to multiple input controller 18. Synchronization signals to identify separate scan lines and to provide page information and marking engine control is transmitted along a job control communications link 58.

Marking engine 12 receives bit stream image data over a bus 60 and job control data over a communications link 62, both for storage in a multiple page buffer memory 64 under the control of a memory management unit 65.

Control means, including a micro controller 66 is arranged to perform arithmetic and logic operations and instruction decoding as well as controlling the time allocation of peripherals (such as a paper supply controller 68 and accessories 70) through a machine control communications link 72. Several output functions may be available for receiver sheets, including selection of output trays, stapling, sorting, folding, finishing, mailbox, envelope receiver, etc.

After appropriate processing, the data is inputted to a writer interface 74 and a writer 76 for forming images on the receiver sheets.

Figure 2:
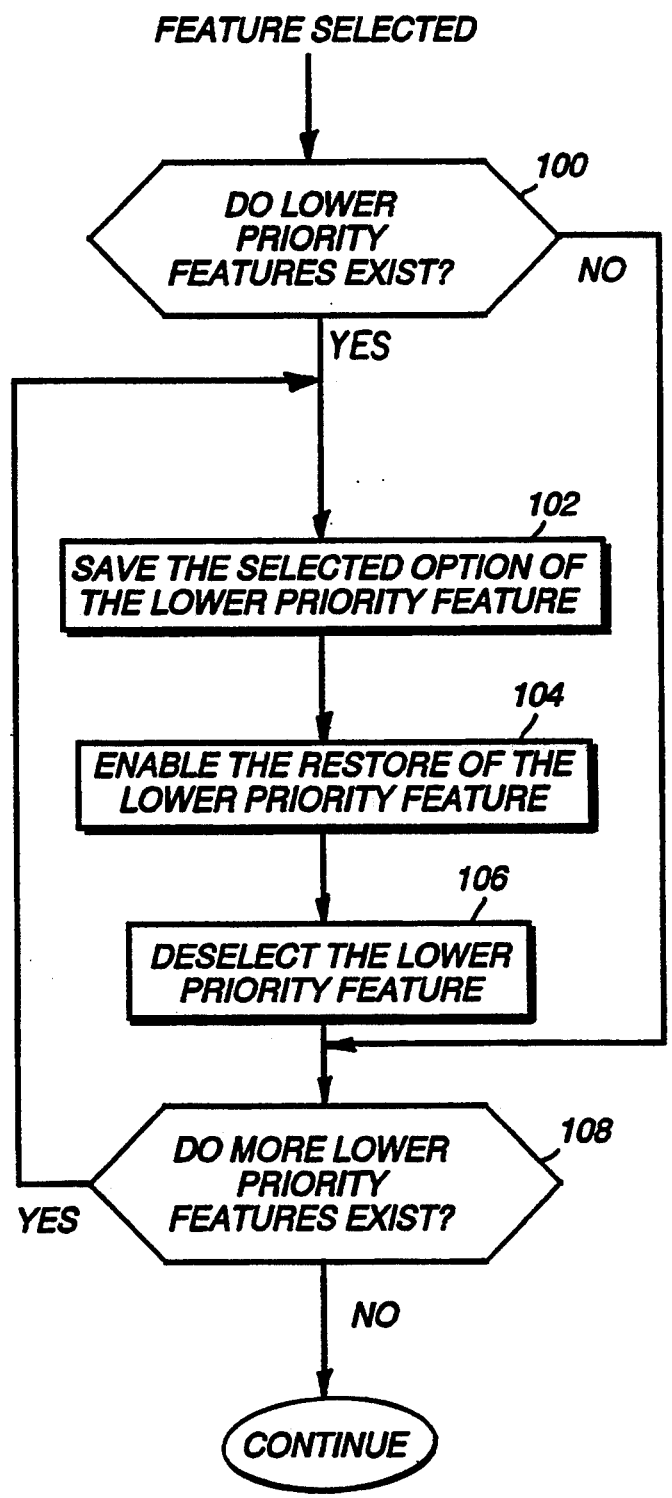
FIG. 2 is a logic flow chart of the operation of the reproduction apparatus of FIG. 1 during selection of a feature.

Operation of the document production apparatus during feature selection will now be explained with reference to FIG. 2. The logic flow chart of FIG. 2 is entered at the top whenever the operator selects a feature. According to a decision block 100, the logic checks for the existence of conflicting lower priority features, either by being designated as a default mode or by prior selection by the operator. If such a feature does indeed exist, its option configuration is saved in electronic memory (logic block 102) and a restore of the lower priority feature is enabled in memory (logic block 104). Now the lower priority feature is deselected (logic block 106). If there are more conflicting lower priority features as determined at a decision block 108, the process is repeated until all conflicts are settled.

Figure 3:
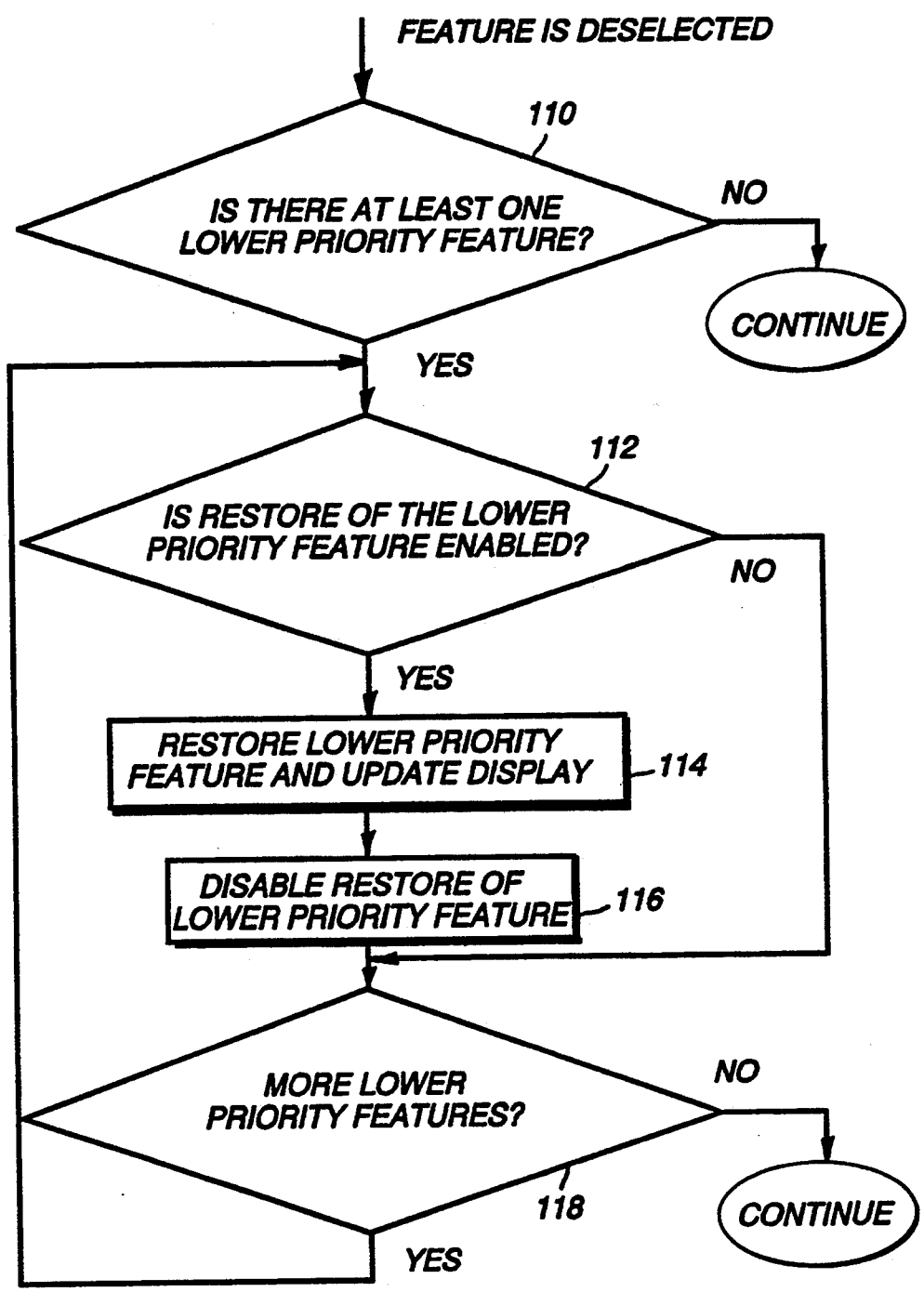
FIG. 3 is a logic flow chart of the operation of the reproduction apparatus of FIG. 1 during deselection of a feature.

Referring now to FIG. 3, the process for deselsection of a feature will be explained. When a feature is deselected, a check is made for lower priority features. If such a lower priority feature is found (logic decision block 110), the electronic memory is poled to determine if the restore for that feature is enabled (logic decision block 112). If so, the feature is automatically restored (logic block 114) with its saved option configuration. At the same time, the operator interface display is updated.

Now, the restore of the lower priority feature is disabled (logic block 116, and a check is made for additional lower priority features at decision block 118.

In some instances, an operator may chose not to automatically restore a lower priority feature when a higher priority feature is deselected. The operator can directly signify this choice by, say, depressing a key on the operator control panel adapted to disable the restore of the lower priority feature.

Alternatively, the system may be set to allow the operator to indirectly accept automatic deselection of a feature by, say, pressing any key on the operator control panel, even if the key were not defined to mean that the deselection of the feature is desired. Similar to direct acceptance, indirect acceptance will disable the restore of the lower priority feature. For example, an operator selects a higher priority feature, which automatically deselects a lower priority, conflicting feature and sets its restore. If the operator deselects the higher priority feature without pressing any other key, the lower priority feature will be restored with its saved option configuration. However, if the operator presses any key other than the one of the keys defined to select or deselect the higher priority feature before deselecting the higher priority feature, the restore of each and every lower priority feature is disabled; and deselection of the higher priority feature will not reselect the lower priority feature.

It can be seen from the above that the present invention provides an efficient and automatic system for restoring the deselected lower priority features when it has been predetermined, based on the history of operator interaction with the document production apparatus, that the restore of the deselected lower priority features is desired. Restoring the lower priority features that have been deselected when a higher priority feature is selected and then deselected will eliminate the need for the operator to reselect the lower priority features. Further, the chance that the document production apparatus will produce undesired output is reduced. The operator will not have to review the feature selections after selecting then subsequently deselecting a feature. Without automatic restoration according to the present invention, the lower priority features will need to be manually reselected, and it is always possible that the operator will not realize that a lower priority feature needs to be reselected.

The invention has been described in detail with particular reference to preferred embodiments thereof, but it will be understood that variations and modifications can be effected within the spirit and scope of the invention.

What is claimed is:

1. A document production apparatus comprising:
   a plurality of operator-selectable features for a job, at least two of which features conflict due to mutually exclusivity thereof and which differ in level of assigned priority;
   means for automatically deselecting a lower priority feature when a conflicting higher priority feature is selected for the job; and
   means, operable upon subsequent deselection of said higher priority feature for automatically restoring the lower priority feature for the job.

2. A document production apparatus as defined in claim 1 wherein, when said higher priority feature is deselected, said restoring means either effects restoration of the lower priority feature or leaves the lower priority feature deselected based on a history of operator interactions in selecting and deselecting said higher priority feature.

3. A document production apparatus as defined in claim 1 wherein:
   the lower priority feature has a plurality of option configurations, and
   said restoring means automatically restores the lower priority feature with the same option configuration as existed before the conflicting higher priority feature was selected.

4. A document production apparatus as defined in claim 3 wherein said deselecting means includes a memory for saving the option configuration of the lower priority feature as it existed before the conflicting higher priority feature was selected.

5. A method for designating features for a job in a document production apparatus having a plurality of operator-selectable features, at least two of which features conflict due to mutually exclusivity thereof and which differ in level of assigned priority, said method comprising the steps of:
   automatically deselecting a lower priority feature when a conflicting higher priority feature is selected for the job; and
   automatically restoring the lower priority feature upon subsequent deselection of said higher priority feature for the job.

6. The method defined in claim 5 wherein the lower priority feature has a plurality of option configurations, and said restoring step includes automatically restoring the lower priority feature with the same option configuration as existed before the conflicting higher priority feature was selected.

7. The method defined in claim 6 wherein the deselecting step includes the step of saving the option configuration of the lower priority feature when the lower priority feature is deselected.

* * * * *